Jan. 30, 1923.
E. E. YAXLEY.
JACK SWITCH.
FILED OCT. 16, 1922.
1,443,604.
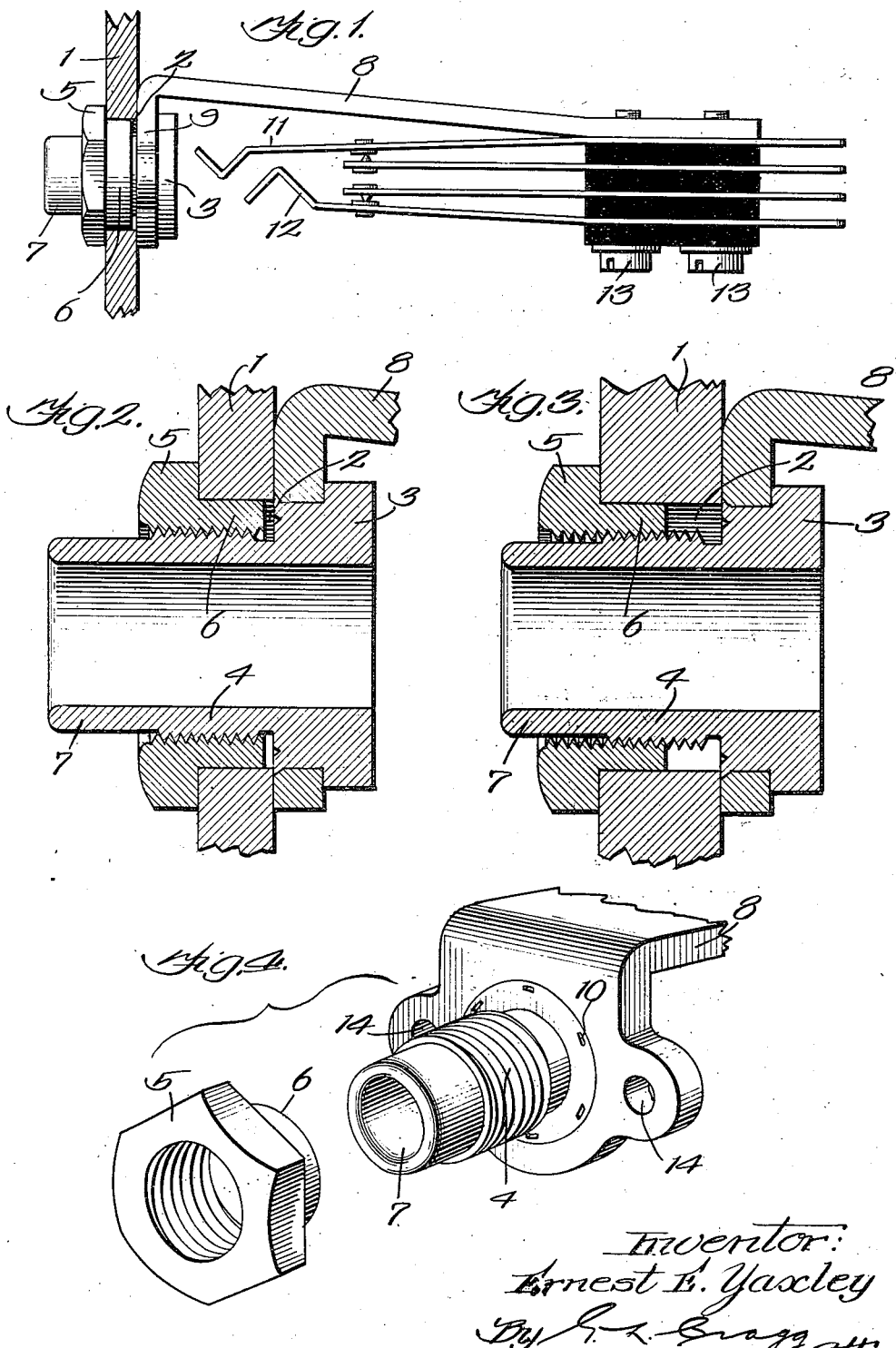
Inventor:
Ernest E. Yaxley Patented Jan. 30, 1923.

1,443,604

UNITED STATES PATENT OFFICE.

ERNEST E. YAXLEY, OF CHICAGO, ILLINOIS, ASSIGNOR OF ONE-HALF TO YAXLEY MANUFACTURING COMPANY, OF CHICAGO, ILLINOIS, A CORPORATION OF ILLINOIS, AND ONE-HALF TO CARTER RADIO COMPANY, OF CHICAGO, ILLINOIS, A CORPORATION OF ILLINOIS.

JACK SWITCH.

Application filed October 16, 1922. Serial No. 594,709.

*To all whom it may concern:*

Be it known that I, ERNEST E. YAXLEY, citizen of the United States, residing at Chicago, in the county of Cook and State of Illinois, have invented a certain new and useful Improvement in Jack Switches, of which the following is a full, clear, concise, and exact description.

My invention relates to switchboards which employ plug receiving thimbles and has for its general object the provision of an improved assembly of a switchboard panel or plate and such a thimble. In the structure of my invention the thimble is formed with a head that is larger than the hole in the plate and which is disposed upon one side of the plate. The thimble also has an exteriorly threaded tubular shank that enters the hole. There is a nut threaded upon the thimble shank, this nut having a head upon the other side of the plate and serving to clamp the plate between this head and the head of the thimble. The nut also has a shank that also enters the hole and preferably substantially fills the hole where this shank is located.

If the jack structure thus assembled with the plate is a spring jack there is also a jack frame having one end interposed between the thimble head and the plate and a contact spring carried by the frame and having a plug engaging end in register with the bore of the thimble. In order that the structure may have a finished appearance the end portion of the thimble shank that is opposite the thimble head is unthreaded and projects beyond the nut in the position the nut had occupied as determined by the thickness of the plate.

The invention will be more fully explained by reference to the accompanying drawing in which Fig. 1 is a side view of a spring jack with the board in the plate for supporting it shown in section; Fig. 2 is a sectional view, on a larger scale, of the portion of the structure at the plate; Fig. 3 is a view similar to Fig. 2 but with a thicker plate between the heads of the thimble and nut, Figs. 2 and 3 illustrating the finished appearance of the structure with the nut in different clamping positions; and Fig. 4 is a perspective view illustrating a portion of the jack frame, the thimble that is preferably permanently assembled therewith and the nut unscrewed from the thimble.

Like parts are indicated by similar characters of reference throughout the different figures.

The mounting board or plate 1 may be of any suitable thickness, two different thickness being illustrated in Figs. 2 and 3. The board is formed with one or more holes 2 therethrough according to the number of jack structures which are to be mounted thereon. Each hole 2 is preferably circular. A jack thimble is formed with a head 3 that is larger than the hole and which is disposed upon one side of the plate. The thimble also has an exteriorly threaded tubular shank 4 that enters the hole. The clamping nut has a head 5 upon the other side of the plate, this nut being in threaded engagement with the thimble in order that the plate may be clamped between the heads of the nut and thimble. A threading upon the interior of the nut is desirably continued throughout the bore of the nut in order to be sufficiently long to maintain the nut and the exteriorly threaded shank of the thimble in threaded engagement when the plate is thick or thin. The nut is formed with a shank 6 that also enters the hole and preferably substantially fills the hole where this shank is located in order that the jack structure may be centered upon the mounting plate.

The shank of the thimble has an end portion 7 that is opposite the thimble head unthreaded to afford a finished appearance at the plug receiving side of the board whether the plate upon which the jack structure is mounted is thick or thin. If the jack structure is a spring jack a jack frame 8 has its end portion 9 that is angular to the balance of the frame formed to surround a reduced portion of the head 3 so as to be interposed between the balance of the head and the plate 1. This frame is preferably permanently assembled with the thimble by pinning the inner face of the thimble head as indicated at 10.

The end of the frame which is remote from the plate 1 supports one or more contact springs 11 and 12 which are assembled with the frame by means of the screws 13 in accordance with any suitable construction as will be understood by those skilled in the art.

The plug engaging ends of these springs are held in register with the bore of the thimble by means of the construction illustrated and described. In order to positively prevent the jack structure from turning the frame 8 may be provided with holes 14 receiving positioning pins that are carried upon the rear face of the plate 1.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a switch structure, the combination with a mounting plate having a hole therethrough; of a thimble formed with a head larger than the hole and disposed upon one side of the plate, said thimble also having an exteriorly threaded tubular shank that enters said hole; a nut threaded upon the thimble shank which has an end portion that is opposite the thimble head unthreaded, this nut having a head upon the other side of the plate and serving to clamp the plate between this head and the head of the thimble, the nut also having a shank that also enters the hole and substantially fills the hole where this shank is located; a jack frame having one end interposed between the thimble head and the plate; and a contact spring carried by the frame and having a plug engaging end in register with the bore of the thimble.

2. In a switch structure, the combination with a mounting plate having a hole therethrough; of a thimble formed with a head larger than the hole and disposed upon one side of the plate, said thimble also having an exteriorly threaded tubular shank that enters said hole; a nut threaded upon the thimble shank, this nut having a head upon the other side of the plate and serving to clamp the plate between this head and the head of the thimble, the nut also having a shank that also enters the hole and substantially fills the hole where this shank is located; a jack frame having one end interposed between the thimble head and the plate; and a contact spring carried by the frame and having a plug engaging end in register with the bore of the thimble.

3. In a switch structure, the combination with a mounting plate having a hole therethrough; of a thimble formed with a head larger than the hole and disposed upon one side of the plate, said thimble also having an exteriorly threaded tubular shank that enters said hole; and a nut threaded upon the thimble shank which has an end portion that is opposite the thimble head unthreaded, this nut having a head upon the other side of the plate and serving to clamp the plate between this head and the head of the thimble, the nut also having a shank that also enters the hole and substantially fills the hole where this shank is located.

4. In a switch structure, the combination with a mounting plate having a hole therethrough; of a thimble formed with a head larger than the hole and disposed upon one side of the plate, said thimble also having an exteriorly threaded tubular shank that enters said hole; and a nut threaded upon the thimble shank, this nut having a head upon the other side of the plate and serving to clamp the plate between this head and the head of the thimble, the nut also having a shank that also enters the hole and substantially fills the hole where this shank is located.

5. In a switch structure, the combination with a mounting plate having a hole therethrough; of a thimble formed with a head larger than the hole and disposed upon one side of the plate, said thimble also having an exteriorly threaded tubular shank that enters said hole; a nut threaded upon the thimble shank which has an end portion that is opposite the thimble head unthreaded, this nut having a head upon the other side of the plate and serving to clamp the plate between this head and the head of the thimble, the nut also having a shank that also enters the hole; a jack frame having one end interposed between the thimble head and the plate; and a contact spring carried by the frame and having a plug engaging end in register with the bore of the thimble.

6. In a switch structure, the combination with a mounting plate having a hole therethrough; of a thimble formed with a head larger than the hole and disposed upon one side of the plate, said thimble also having an exteriorly threaded tubular shank that enters said hole; a nut threaded upon the thimble shank, this nut having a head upon the other side of the plate and serving to clamp the plate between this head and the head of the thimble, the nut also having a shank that also enters the hole; a jack frame having one end interposed between the thimble head and the plate; and a contact spring carried by the frame and having a plug engaging end in register with the bore of the thimble.

7. In a switch structure, the combination with a mounting plate having a hole therethrough; of a thimble formed with a head larger than the hole and disposed upon one side of the plate, said thimble also having an exteriorly threaded tubular shank that enters said hole; and a nut threaded upon the thimble shank which has an end portion that is opposite the thimble head unthreaded, this nut having a head upon the other side of the plate and serving to clamp the plate between this head and the head of the thimble, the nut also having a shank that also enters the hole.

8. In a switch structure, the combination with a mounting plate having a hole therethrough; of a thimble formed with a head larger than the hole and disposed upon one side of the plate, said thimble also having an exteriorly threaded tubular shank that enters said hole; and a nut threaded upon the thimble shank, this nut having a head upon the other side of the plate and serving to clamp the plate between this head and the head of the thimble, the nut also having a shank that also enters the hole.

In witness whereof, I hereunto subscribe my name this 13th day of October A. D. 1922.

ERNEST E. YAXLEY.